United States Patent
Soo et al.

(10) Patent No.: US 9,524,067 B2
(45) Date of Patent: Dec. 20, 2016

(54) CAPACITIVE TOUCH SCREEN WITH ADAPTIVE TOUCH SENSING THRESHOLD BASED ON SHARPNESS OF THE CAPACITIVE DATA

(71) Applicant: STMicroelectronics Asia Pacific Pte Ltd, Singapore (SG)

(72) Inventors: Jenn Woei Soo, Singapore (SG); Kusuma Adi Ningrat, Seoul (KR)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 14/484,372

(22) Filed: Sep. 12, 2014

(65) Prior Publication Data

US 2016/0077625 A1    Mar. 17, 2016

(51) Int. Cl.
*G06F 3/045* (2006.01)
*G06F 3/044* (2006.01)

(52) U.S. Cl.
CPC ..... *G06F 3/044* (2013.01); *G06F 2203/04108* (2013.01)

(58) Field of Classification Search
CPC ....................................... G06F 3/044
USPC ....................... 345/174; 178/18.06
See application file for complete search history.

(56) References Cited

U.S. PATENT DOCUMENTS

| | | | |
|---|---|---|---|
| 8,610,686 B1 | 12/2013 | Peng et al. | |
| 2004/0252109 A1* | 12/2004 | Trent, Jr. | G06F 3/044 345/174 |
| 2008/0106520 A1* | 5/2008 | Free | G06F 3/044 345/173 |
| 2010/0073301 A1 | 3/2010 | Yousefpor et al. | |
| 2011/0007021 A1* | 1/2011 | Bernstein | G06F 3/044 345/174 |
| 2011/0057670 A1* | 3/2011 | Jordan | G06F 3/044 324/679 |
| 2011/0141054 A1* | 6/2011 | Wu | G06F 3/0418 345/174 |
| 2012/0235936 A1* | 9/2012 | Yeh | G06F 3/044 345/173 |
| 2015/0029131 A1* | 1/2015 | Cheng | G06F 3/044 345/174 |

* cited by examiner

*Primary Examiner* — Adam J Snyder
(74) *Attorney, Agent, or Firm* — Gardere Wynne Sewell LLP

(57) ABSTRACT

A capacitive touch system generates data indicative of sensed capacitance measured at capacitive sensing nodes of a capacitive touch panel. A signal processing circuit is coupled to receive the data indicative of sensed capacitance from the capacitive touch system. The signal processing circuit operates to fit a parabolic curve to the data indicative of sensed capacitance. A sharpness of the fit parabolic curve is indicative of whether touch versus hover interaction with the capacitive touch panel. A touch detection threshold is as a function of the determined sharpness. The set touch detection threshold is then applied against the data indicative of sensed capacitance in order to make a touch detection.

24 Claims, 11 Drawing Sheets

CAPACITIVE TOUCH SCREEN WITH ADAPTIVE TOUCH SENSING THRESHOLD BASED ON SHARPNESS OF THE CAPACITIVE DATA

FIELD OF THE INVENTION

The present disclosure generally relates to a capacitive sensor and, in particular, to a capacitive touch screen.

BACKGROUND

Reference is made to FIG. 1 which schematically illustrates a conventional capacitive touch screen system 10. The touch screen system 10 includes a touch screen panel 10p that is formed to include an array of capacitive sense nodes 12. Each sense node 12 is located at a point where a drive (or force) line 14 crosses a sense line 16. In a common implementation, the drive and sense lines 14 and 16 are formed of a conductive material. The plurality of drive lines 14 are formed in a first material layer that is supported by a substrate. The plurality of sense lines 16 are formed in a second material layer that is also supported by the substrate. The first and second material layers are separated by a layer of dielectric material. At each sense node 12 a capacitor 12c is thus formed which is comprised of a first plate 14a (from the portion of the drive line 14 at the point of crossing), a second plate 16a (from the portion of the sense line 16 at the point of crossing) and a dielectric 18 positioned between the first and second plates. The capacitor 12c at each sense node 12 will exhibit an associated mutual (or coupling) capacitance value as known in the art.

Although the drive and sense lines 14 and 16 are illustrated as linear structures, it will be understood that this is merely one typical implementation and that it is known in the art to form drive and sense lines having shapes other than linear. For example, serially connected diamond shapes are well known in the art to form drive/sense lines.

Furthermore, although the drive and sense lines 14 and 16 are described as being located in different layers, it will be understood that this is merely one typical implementation and that it is known in the art to form the drive and sense lines in a common material layer, with the point of crossing at sense nodes 12 being provided through a conductive bridge and intervening dielectric structure.

The drive lines 14 are activated by force signals output by drive circuits 20 coupled to the drive lines. In a common implementation, the force signals output from the drive circuits 20 may comprise an AC signal. The sense lines 16 are coupled to the inputs of sense circuits 22 which may operate as sense amplifiers (for example, charge amplifiers or transconductance amplifiers) to generate an output signal.

Because of the application of an AC signal to the drive lines, and the presence of a capacitive coupling to the sense lines, the output signal generated by each sense circuit 22 will be indicative of the capacitance at the sense node 12. For example, the AC signal applied by a drive circuit 20 to a given drive line 14 is coupled through the capacitor 12c at a sense node 12 to the crossing sense line 16. The sense circuit 22 coupled to the crossing sense line 16 receives the coupled AC signal and detects a voltage on the sense line. The magnitude of the sensed voltage varies as a function of the mutual (or coupling) capacitance for the capacitor 12c at the sense node 12.

The presence of an object, such as a human body part (for example, a finger) or device (for example, a stylus) near the sense node 12 causes a change in the mutual (or coupling) capacitance for the capacitor 12c at that sense node 12. As a result, there will be a change in the coupled AC signal, and a corresponding change in the magnitude of the voltage sensed by the sense circuit 22, as a result of the object's presence and its effect on the mutual (or coupling) capacitance for the capacitor 12c at the sense node 12.

A control circuit 26 is coupled to the drive circuits 20 and sense circuits 22. The control circuit 26 includes a drive controller 28 which operates to sequentially actuate each of the drive circuits 20 to apply the AC signal to each drive line 14. The control circuit 26 further includes a signal processing circuit 30 coupled to the outputs of the sense circuits 22. For each drive controller 28 actuation of a drive circuit 20, the signal processing circuit 30 operates to read the voltage of the coupled AC signal as sensed by each of the sense circuits 22. As a result, a voltage value is collected by the signal processing circuit 30 from each sense node 12 of the capacitive touch screen 10. The collected voltage values are then processed by the signal processing circuit 30 to determine presence of the object and the location (or locations) of that object.

In this context, detecting the presence of the object may include in some configurations the ability of the control circuit 26 to detect from the collected voltage values both an actual touch of the capacitive touch screen by the object as well as instances where the object is close to, but not touching, the capacitive touch screen (this being referred to in the art as a "hover" detection).

The detection by the signal processing circuit 30 of object presence is typically made by comparing the collected voltage values at the sense nodes 12 to a threshold value. If a sufficient number of voltage values in an area of the capacitive touch screen 10 are determined by the signal processing circuit 30 to exceed the threshold value, the control circuit 26 will generate an output signal indicative of the detection and location of object presence at that area.

Reference is now made to FIG. 2A which illustrates an overlay of sensed voltage values at the sense nodes 12 for a portion of the capacitive touch screen 10. In this case, the voltage values, here represented by a corresponding signal code value generated by the signal processing circuit 30 in response to the sense circuit 22 output, were sensed as a result of an actual touch 40 of the capacitive touch screen by a human finger. The magnitude of the signal code values is higher at sense nodes closer to the point where finger contact is made with the capacitive touch screen. It will be noted that a large number of sensed values have magnitudes in excess of an exemplary threshold value of "200". This will be interpreted by the signal processing circuit 30 of the control circuit 26 as a detected touch of the capacitive touch screen 10 and a corresponding output signal is generated. For a finger touch, in an exemplary implementation, the signal code values associated with a touch may even be as high as 800-1000, and thus the illustrated values in FIG. 2A are for example only.

Reference is now made to FIG. 2B which again illustrates an overlay of sensed voltage values at the sense nodes 12 for a portion of the capacitive touch screen 10. In this case, the voltage values (represented by corresponding signal code values) were sensed as a result of an actual touch 42 of the capacitive touch screen by a stylus. The magnitude of the signal code values is higher at sense nodes closer to the point where stylus contact is made with the capacitive touch screen. However, because the touch area for a stylus is much smaller than the touch area for a human finger, there are fewer sense nodes which have signal code values. If the exemplary threshold of "200" from FIG. 2A is used in this case, the signal processing circuit 30 of the control circuit 26 will not indicate the detection of a touch because an insufficient number of sense nodes 12 have signal code values in excess of the exemplary threshold. For a stylus touch, in an exemplary implementation, the signal code values associated with a touch are typically less than those associated with a finger touch (for example, less than 800), and thus the illustrated values in FIG. 2B are for example only.

To ensure that the stylus touch 42 is in fact detected, one option is to lower the threshold value. For example, if the threshold value is lowered to a threshold value of "100", for example, then a sufficient number of sense nodes 12 (in this case two or mode) will have signal code values in excess of the lower threshold. This will be interpreted by the signal processing circuit 30 of the control circuit 26 as a detected touch of the capacitive touch screen 10. It will be understood that a stylus detection can be made from a single node 12 value in excess of the threshold.

The foregoing analysis is made without consideration of the time domain. If the time domain is considered in the calculation, the lowering of the threshold value so as to permit making the stylus touch detection can produce a problem with respect to the accuracy of the touch detection operation.

Consider now the situation where the human finger is moving towards the capacitive touch screen, but has not yet make an actual touch contact with the capacitive touch screen. FIG. 2C illustrates an overlay of sensed voltage values at the sense nodes 12 for a portion of the capacitive touch screen 10 at a point in time in advance of the actual touch event occurrence. The voltage values, here again represented by corresponding signal code values, are in effect sensing a "hover" by the moving human finger over the capacitive touch screen. The magnitude of the signal code values is higher at sense nodes closer to the point where the finger hovers over the capacitive touch screen. However, it will be noted that all the signal code values have a much lower magnitude in comparison to the instance of an actual touch as described above in connection with FIG. 2A. If the exemplary threshold value of "200" for a finger touch detection (FIG. 2A) is applied in this case, no (or an insufficient number of) signal code values will exceed the exemplary threshold and the signal processing circuit 30 of the control circuit 26 will correctly identify that no touch of the capacitive touch screen has (as yet) occurred.

However, if the lowered threshold value of "100" (as discussed above in connection with FIG. 2B) is instead applied, in a manner consistent with wanting to permit the making of a stylus touch detection, then it will be noted that a sufficient number of sense nodes 12 (in this case two or more) have signal code values in excess of that lower threshold. So, the hover condition of the moving finger will then be incorrectly interpreted by the signal processing circuit 30 of the control circuit 26 as an actual detected (stylus) touch of the capacitive touch screen 10.

Importantly, the incorrect detection of the hover condition as an actual touch of the capacitive touch screen is premature in the time domain with respect to the movement of the finger towards the capacitive touch screen. Those skilled in the art will recognize that such premature (incorrect) touch detection can cause significant problems for the execution of applications (such as games) which rely on an accurately timed detection of a touch as a control input. This can be a significant source of user dissatisfaction with the operation of the capacitive touch screen.

There is accordingly a need in the art for a way to more accurately make different types of detections in connection with the operation of a capacitive touch screen.

SUMMARY

In an embodiment, a system comprises: a capacitive touch system configured to generate data indicative of sensed capacitance; and a signal processing circuit coupled to the capacitive touch system and configured to: fit a parabolic curve to the data indicative of sensed capacitance, determine a sharpness of the fit parabolic curve, and set a touch detection threshold for application against the data indicative of sensed capacitance as a function of the determined sharpness.

In an embodiment, a method comprises: generating data indicative of sensed capacitance at a capacitive touch system; fitting a parabolic curve to the data indicative of sensed capacitance; determining a sharpness of the fit parabolic curve; and setting a touch detection threshold for application against the data indicative of sensed capacitance as a function of the determined sharpness.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE DRAWINGS

Figure 3:
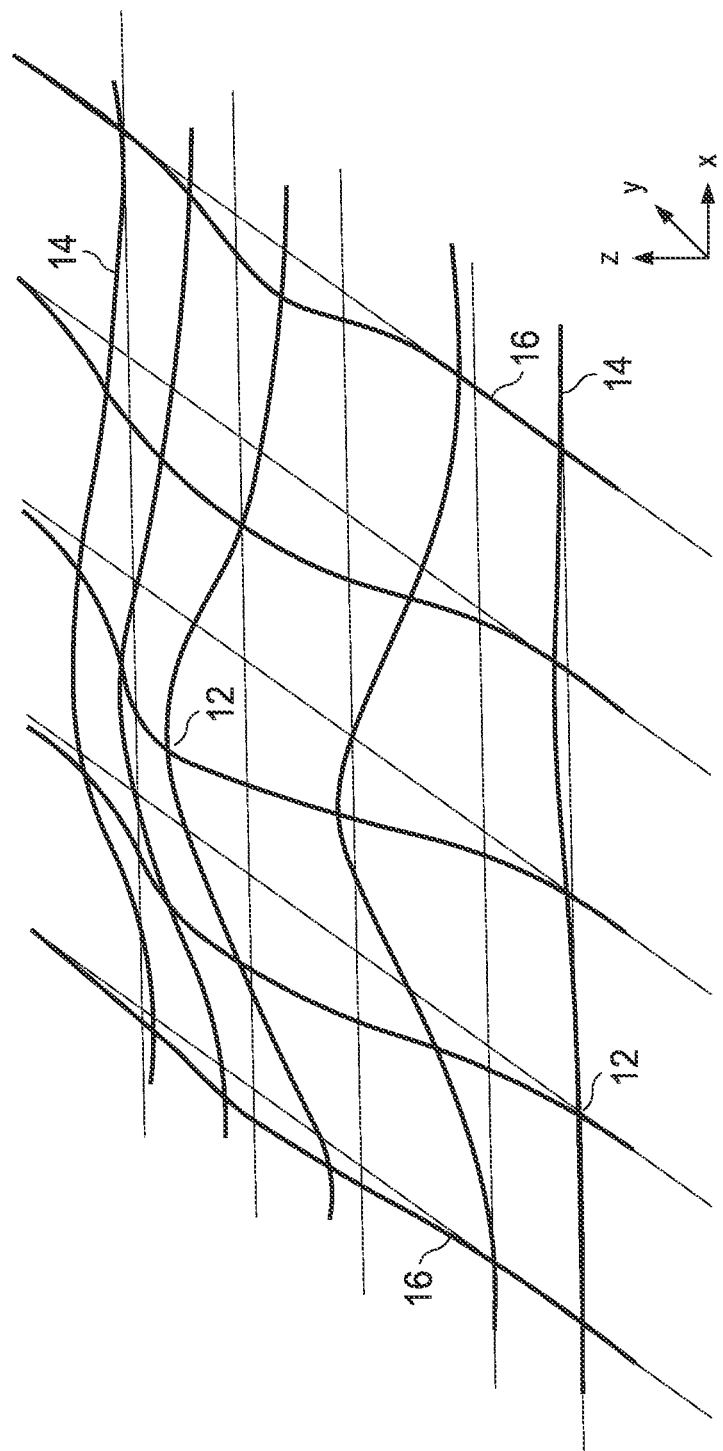
FIG. 3 illustrates an exemplary 3D representation of touch screen data.

A 3D representation of the magnitude of the signal code values can be generated. An example of such a 3D representation is shown in FIG. 3 wherein the x-y plane corresponds to the plane of the capacitive touch screen and the z-axis, which extends perpendicular to the x-y plane corresponds to magnitude of the signal code values.

Figure 2A:
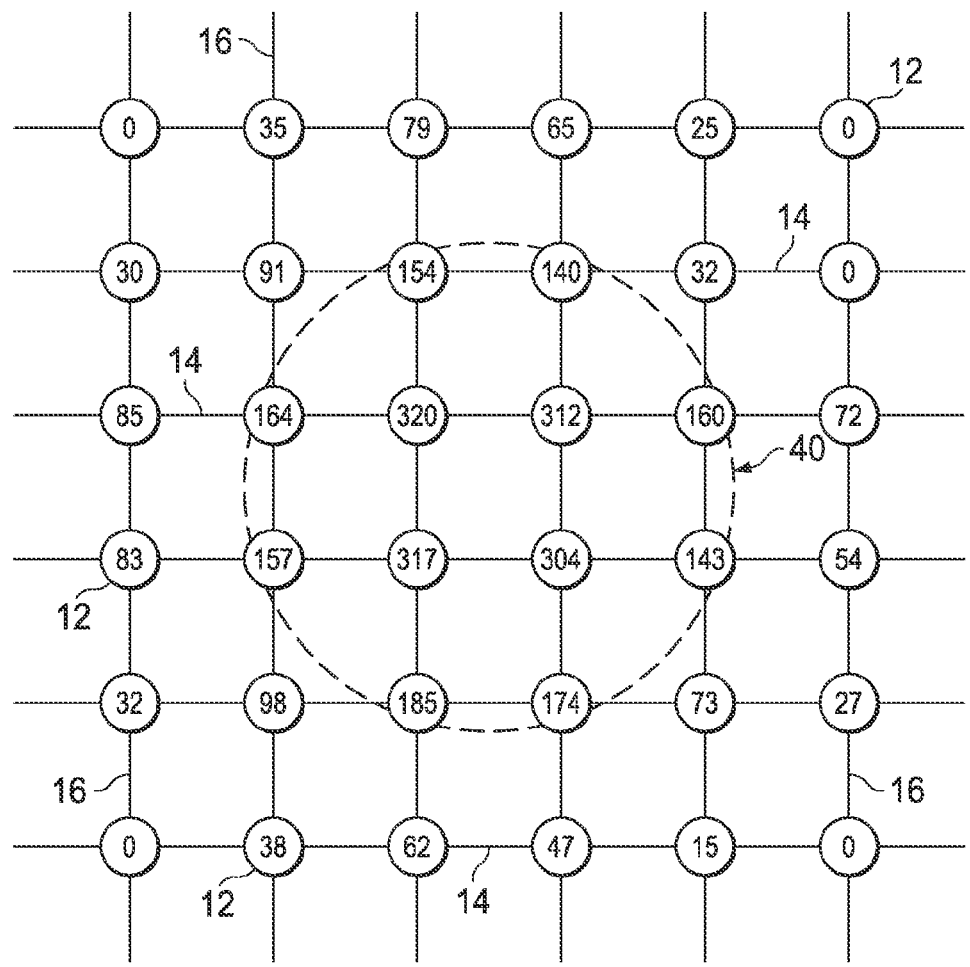
FIGS. 2A-2C illustrate examples of the use of a threshold to make different capacitive touch screen detections.
Figure 2B:
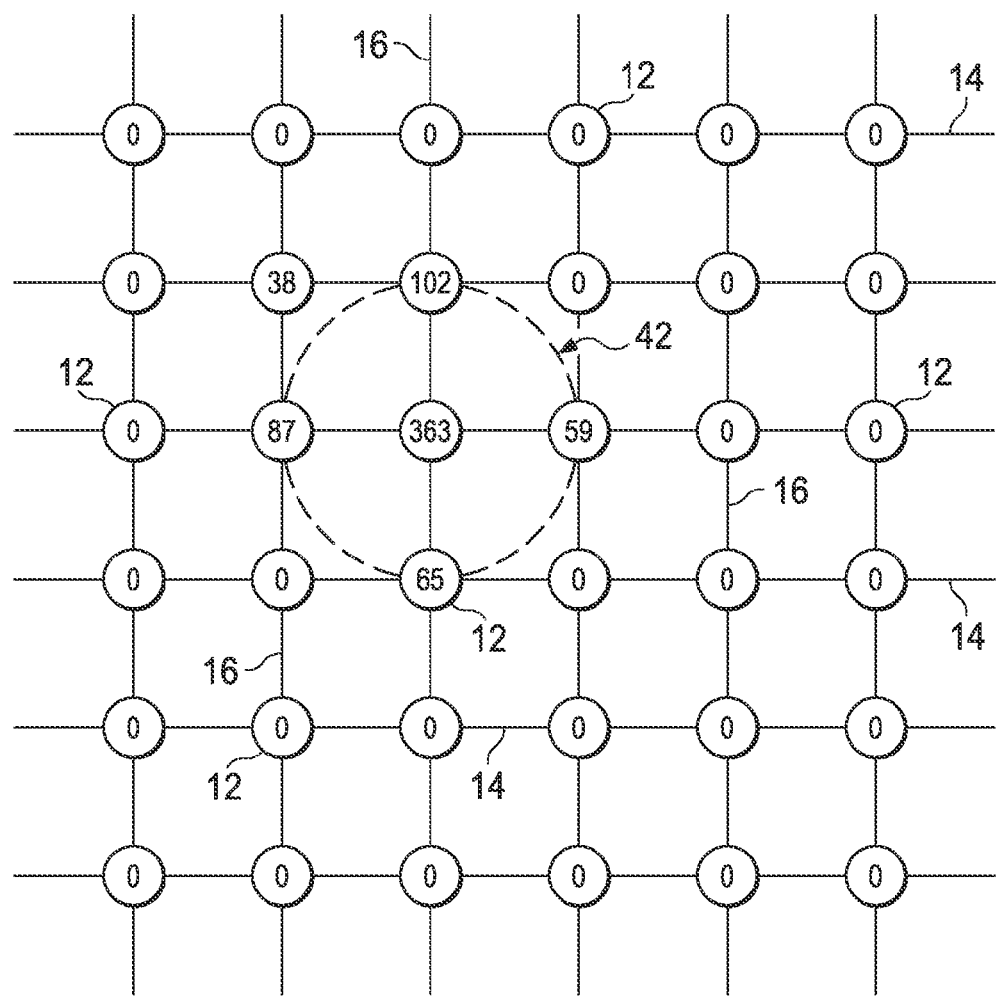
Figure 2C:
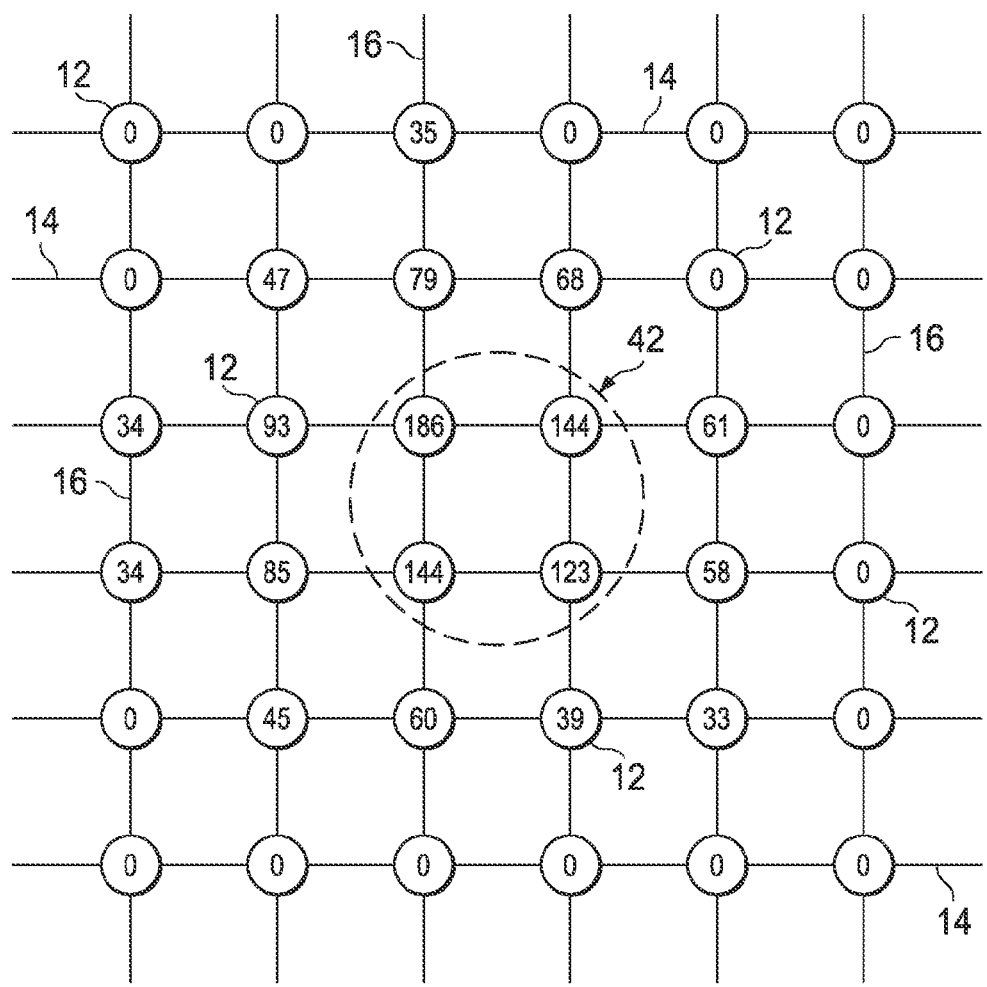
Figure 4A:
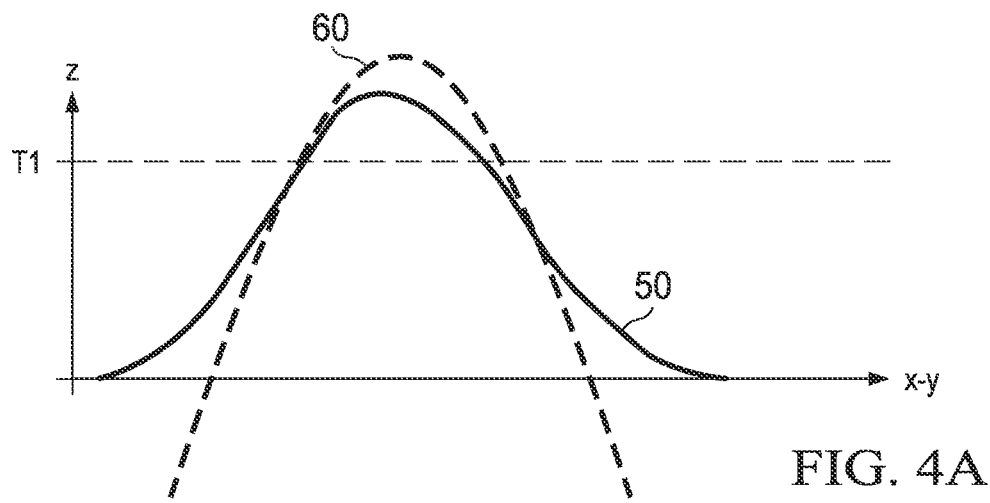
FIGS. 4A-4C touch profiles and fitted parabolic curves.
Figure 4B:
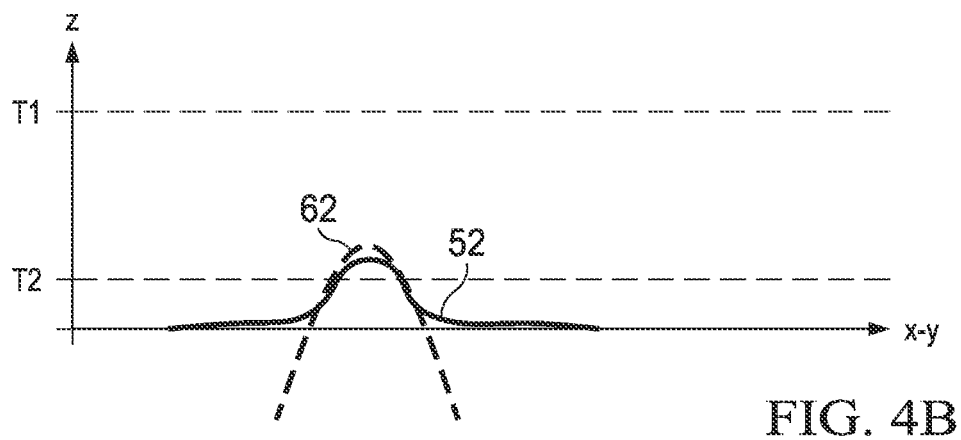
Figure 4C:
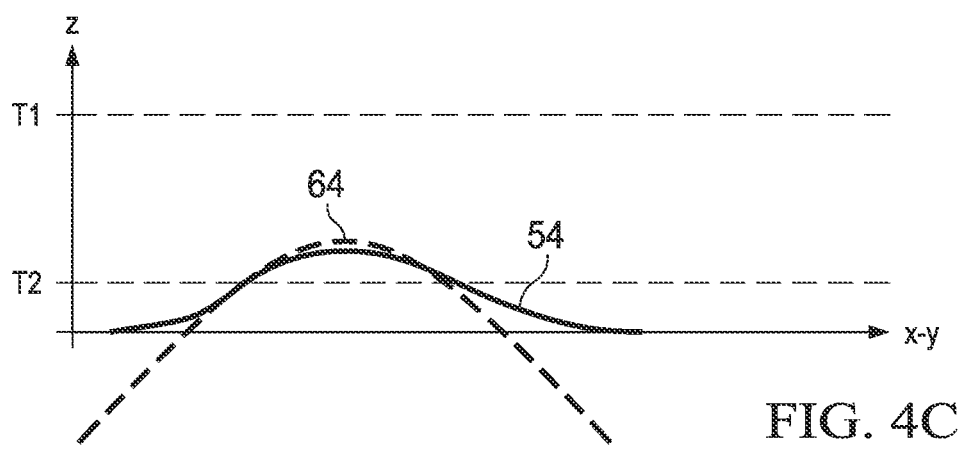

By taking a cross-section parallel to the z-axis and perpendicular to the x-y plane, a touch profile can be generated. FIG. 4A illustrates an example of such a touch profile 50 corresponding to a finger touch (see, FIG. 2A, for example), FIG. 4B illustrates an example of such a touch profile 52 corresponding to a stylus touch (see, FIG. 2B, for example)

and FIG. 4C illustrates an example of such a touch profile 54 corresponding to a moving, but not yet touching, finger (the hover condition; see, FIG. 2C, for example).

With reference to FIG. 4A, it will be noted that by setting an exemplary detection threshold T1, an actual touch detection will be made from the touch profile 50 for the touching finger. However, with reference to FIG. 4B, the exemplary detection threshold T1 is too high to result in an actual touch detection for the touching stylus. To address this issue, as discussed above, a lowered threshold T2 can instead be used. This lowered threshold T2 is satisfied by the touch profile 50 for the touching finger, and thus there is no change in the ability to make the touch detection in that situation. The lowered threshold T2 is also satisfied by the touch profile 52 for the touching stylus, and thus an actual touch detection will be correctly made. However, the lowered threshold T2 is also satisfied by the touch profile 54 for the hovering finger, and thus an erroneous (as discussed above, premature) actual touch detection will be made.

It will be noted that each of the touch profiles 50-54 can be considered to mimic a parabolic shape. The corresponding parabolas 60, 62 and 54 generally fitted to the shape of the touch profiles 50, 52 and 54 are shown in FIGS. 4A, 4B and 4C. It can be seen that the sharpness (also referred to as the narrowness) of the fitted parabolic shape 60-64 differs based on the nature of the touch and its corresponding touch profile 50-54. In this regard, the touch profiles 50 and 52 for actual touches by a finger and a stylus, while not having corresponding magnitudes, have fitted parabolic shapes 60, 62 that are both more "sharp" (or narrower) than the fitted parabolic shape 64 for the touch profile 54 for the hover case (which exhibits a relatively speaking more "flat" (wider) shape).

The mathematical equation defining a parabola is well known to those skilled in the art in the standard format as: $y=ax^2+bx+c$; wherein $a=\frac{1}{4}p$ and p is the distance from the vertex to the focus of the parabola (also referred to by those skilled in the art as the focal length of the parabola). The constant "a" in the equation for a parabola is referred to by those skilled in the art as the "quadratic constant" and the absolute magnitude of the quadratic constant "a" is known to be directly proportional to the "sharpness" (narrowness) of the parabola. In other words, the larger the absolute magnitude of the quadratic constant "a", the sharper (or more narrow) the parabolic shape.

With reference to FIGS. 4A-4C, the absolute magnitude of the quadratic constant "a" for the parabolas 60, 62 which are fit to the touch profiles 50, 52 for actual touches of the capacitive touch screen is substantially greater than the absolute magnitude of the quadratic constant "a" for the parabola 64 fit to the touch profile 54 for the hover condition. From this fact, the absolute magnitude of the quadratic constant "a" for a fitted parabola can be used to assist in addressing the issue of incorrectly detecting the hover condition as an actual touch of the capacitive touch screen. So, the parabolas 60 and 64 will have a smaller sharpness value compared to that of parabola 62. Generally speaking, finger touch/hover conditions exhibit a flatter profile than a stylus touch.

A quadratic constant threshold value Ta is set to distinguish between the touch profiles 50, 52 for actual touches of the capacitive touch screen and the touch profile 54 for the hover condition. The sensed voltage values are obtained from the capacitive touch screen and converted, as needed, to values for processing. For example, as discussed above, the sensed voltage values may be converted to signal code values (or alternatively to another signal processing format as known in the art). From the signal code values, a touch profile is generated. Using a curve fitting technique as known in the art, a parabola is identified which best fits the touch profile. The identified parabola which is fit to the touch profile may be mathematically represented at least by its quadratic constant "a". The quadratic constant "a" is then compared to the quadratic constant threshold value Ta. If the quadratic constant "a" meets or exceeds the quadratic constant threshold value Ta, a relatively lower detection threshold (for example, the threshold T2 as discussed above) is used to make the actual touch determination. Conversely, if the quadratic constant "a" is less than the quadratic constant threshold value Ta, a relatively higher detection threshold (for example, the threshold T1 as discussed above) is used to make the actual touch determination.

The adaptive change of the detection threshold (T1 or T2) dependent on the quadratic constant "a" of the parabola 64 fitted to the touch profile permits an accurate detection of an actual touch by the stylus or finger (see, FIGS. 4A and 4B) using the lower threshold T2 along with an accurate detection of a no touch by the hovering finger (see, FIG. 4C) using the higher threshold T1.

Figure 1:
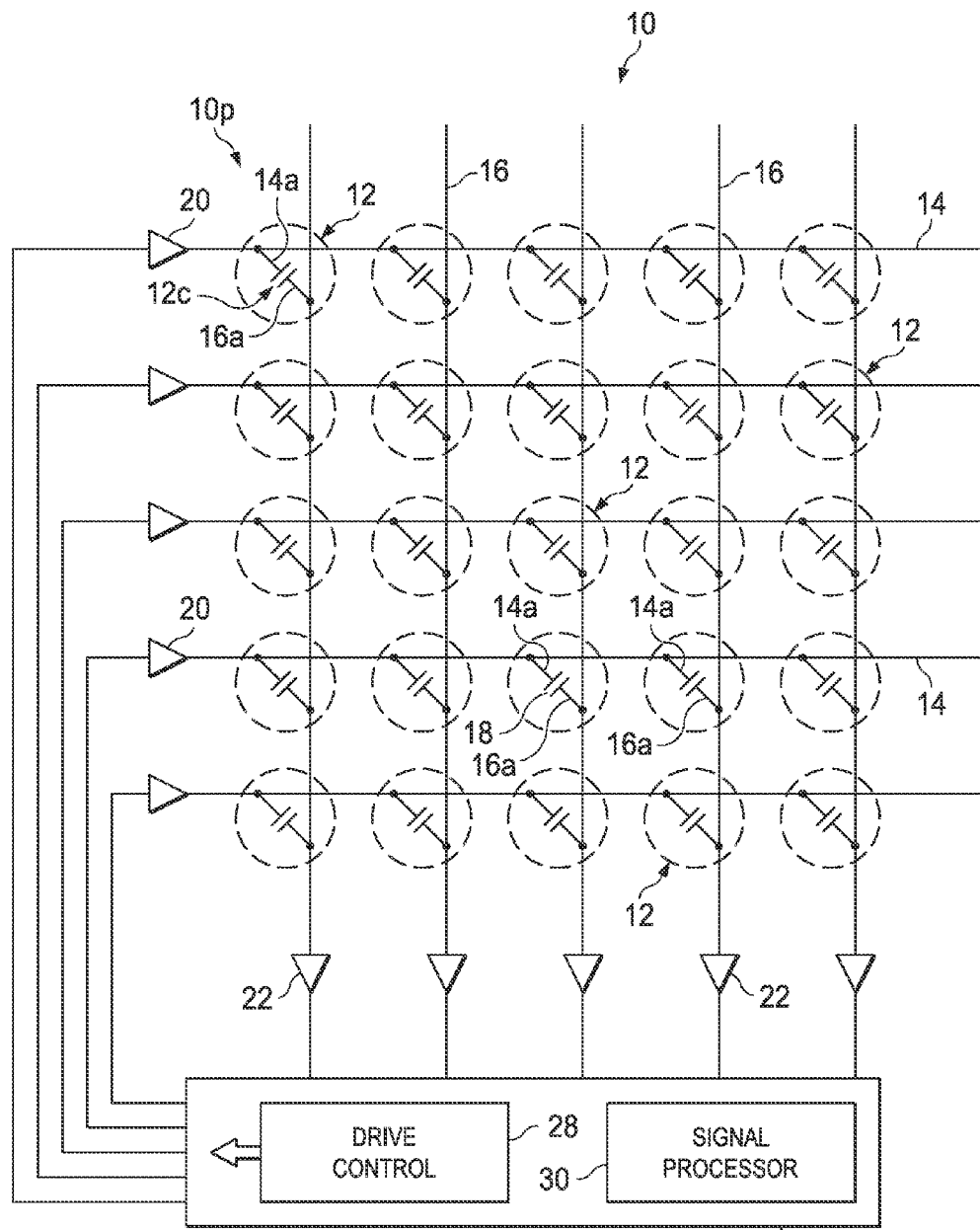
FIG. 1 is a schematic illustration of a conventional capacitive touch screen system.
Figure 5:
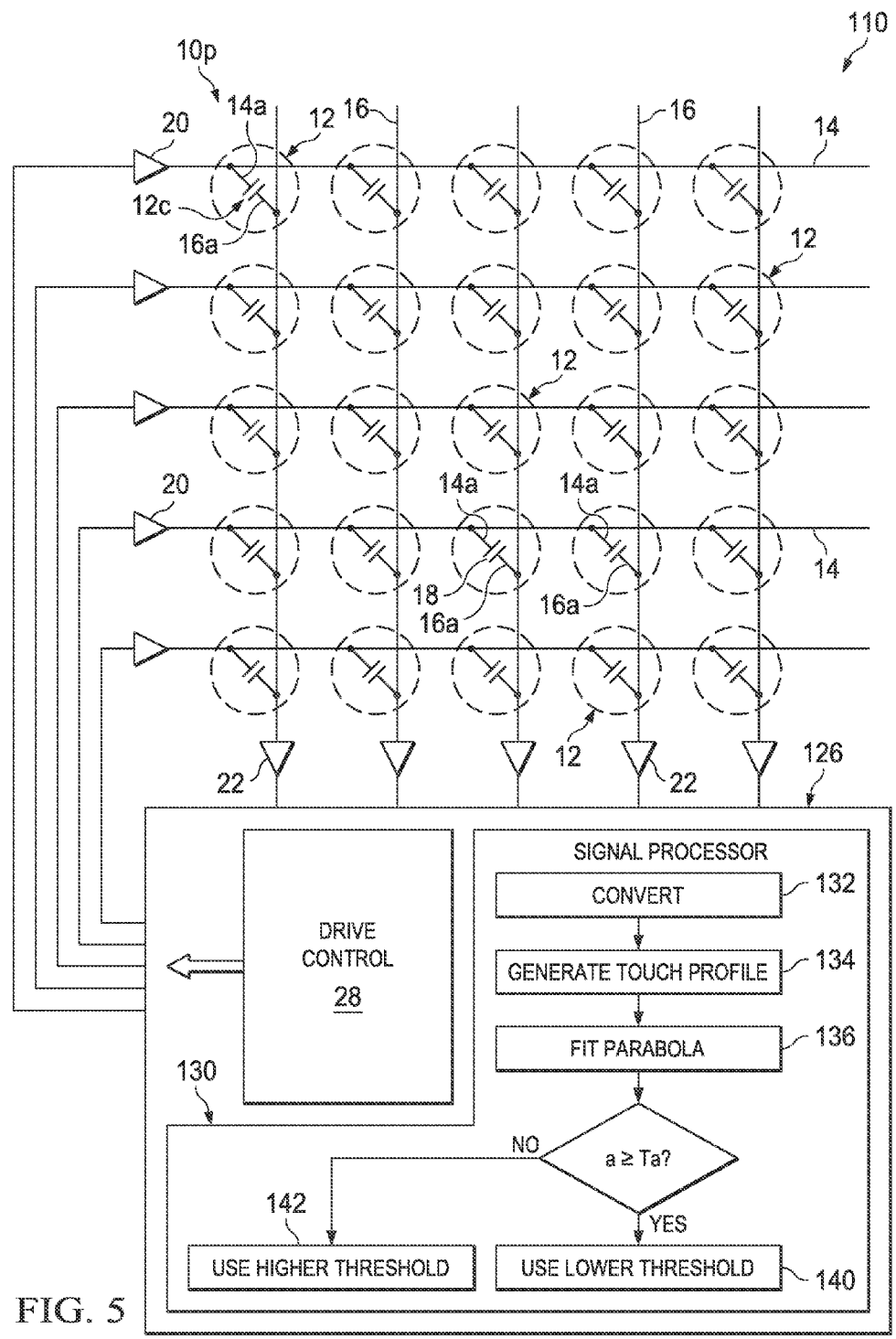
FIG. 5 is a schematic illustration of a capacitive touch screen system implementing adaptive thresholding.

Reference is now made to FIG. 5 which schematically illustrates a capacitive touch screen system 110 implementing adaptive thresholding. Like reference numbers refer to like of similar parts in FIG. 1 and will not be further described.

The system 110 includes a control circuit 126 coupled to the drive circuits 20 and sense circuits 22. The control circuit 126 includes the drive controller 28 which sequentially actuates the drive circuits 20 with application of an AC signal to each drive line 14. The control circuit 126 further includes a signal processing circuit 130 coupled to the outputs of the sense circuits 22. For each drive controller 28 actuation of a drive circuit 20, the signal processing circuit 130 operates to read the voltage of the coupled AC signal as sensed by each of the sense circuits 22. As a result, a voltage value is collected by the signal processing circuit 130 from each sense node 12 of the capacitive touch screen 10. The collected voltage values are then processed by the signal processing circuit 130 to determine presence of the object and the location (or locations) that object.

The signal processing circuit 130 converts (operation 132) the collected voltage values to signal code values (or alternatively to another signal processing format as known in the art). The signal processing circuit 130 further generates (operation 134) a touch profile from the signal code values. Using a curve fitting technique as known in the art, the signal processing circuit further fits (operation 136) a parabola to the touch profile. The identified parabola which is fit to the touch profile may be mathematically represented at least by its quadratic constant "a" (in the well known parabolic mathematic definition of: $y=ax^2+bx+c$; wherein the quadratic constant $a=\frac{1}{4}p$ and p is the distance from the vertex to the focus of the parabola (also referred to by those skilled in the art as the focal length of the parabola)). The signal processing circuit 130 then compares (operation 138) the quadratic constant "a" for the fit parabola to a quadratic constant threshold value Ta. If the quadratic constant "a" meets or exceeds the quadratic constant threshold value Ta (Yes at operation 138), the signal processing circuit 130 will use a relatively lower detection threshold (for example, the threshold T2 as discussed above) to make the actual touch determination (operation 140). Conversely, if the quadratic constant "a" is less than the quadratic constant threshold value Ta (No at operation 138), the signal processing circuit 130 will instead use a relatively higher detection threshold (for example, the threshold T1 as discussed above) to make the actual touch determination (operation 142).

Figure 6A:
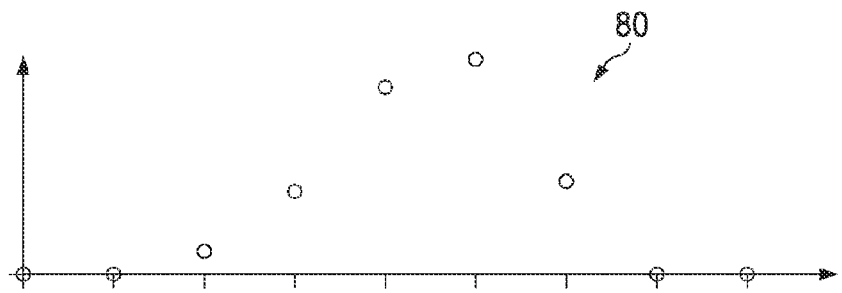
FIGS. 6A-6C generally illustrate the process for developing the touch profile and fitting a parabolic curve.
Figure 6B:
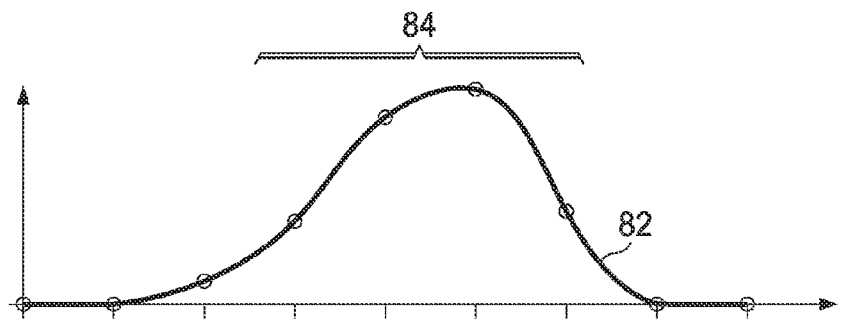
Figure 6C:
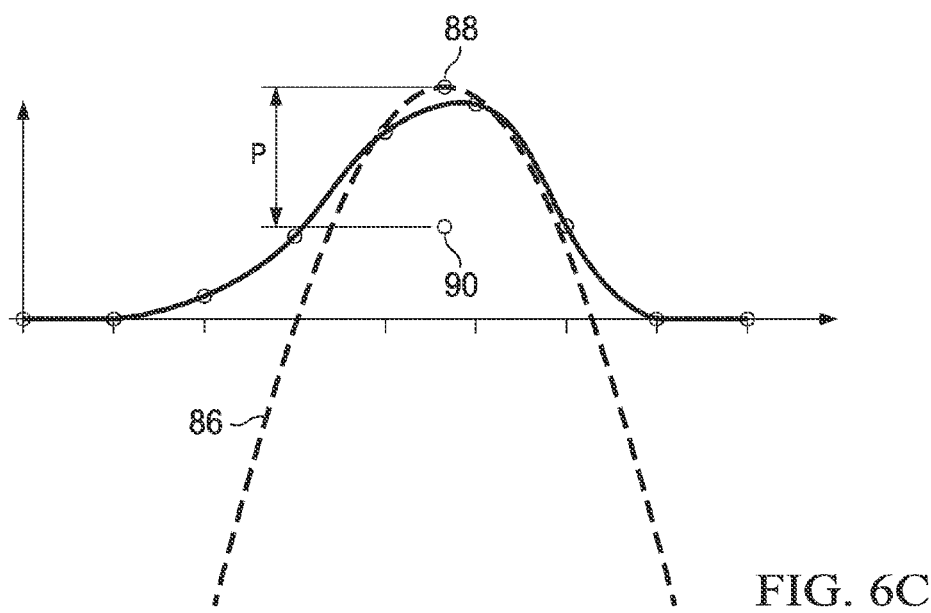

Reference is now made to FIGS. 6A-6C which generally illustrate the process for developing the touch profile and fitting a parabolic curve. As discussed above, the touch profile is derived from the voltage values collected from sensing the capacitive touch screen 10 (or from the signal code values obtained from the voltage values). With brief reference to FIGS. 2A-2C, the signal code values taken along either a drive line 14 or a sense line 16 may be plotted 80 as shown in FIG. 6A. The plot 80 may be obtained using other techniques (an example which is provided below in connection with FIGS. 7A and 8A). A touch profile 82 corresponding to the plotted 80 signal code values is then determined as shown in FIG. 6B. The central portion 84 of the touch profile 82 mimics a parabolic shape. A curve fitting calculation then performed with respect to at least the central portion to fit a parabola 86 to the touch profile 82 as shown in FIG. 6C. With respect to the fit parabola 86, the parameters of the parabola are then determined. For example, a least square estimation algorithm may be executed to calculate the parameters. The parameters of particular interest are the vertex 88 and the focus 90. The vertical distance p between the vertex 88 and 90 is then determined. The quadratic constant "a" is then determined from the equation $a=\frac{1}{4}p$. Once the quadratic constant "a" for the parabola 86 fitting the touch profile 82 has been determined, a comparison is made against the quadratic constant threshold value Ta to identify which one of the relatively higher or relatively lower detection thresholds will be used to evaluate the touch profile for touch detection.

Figures 7A, 7B:
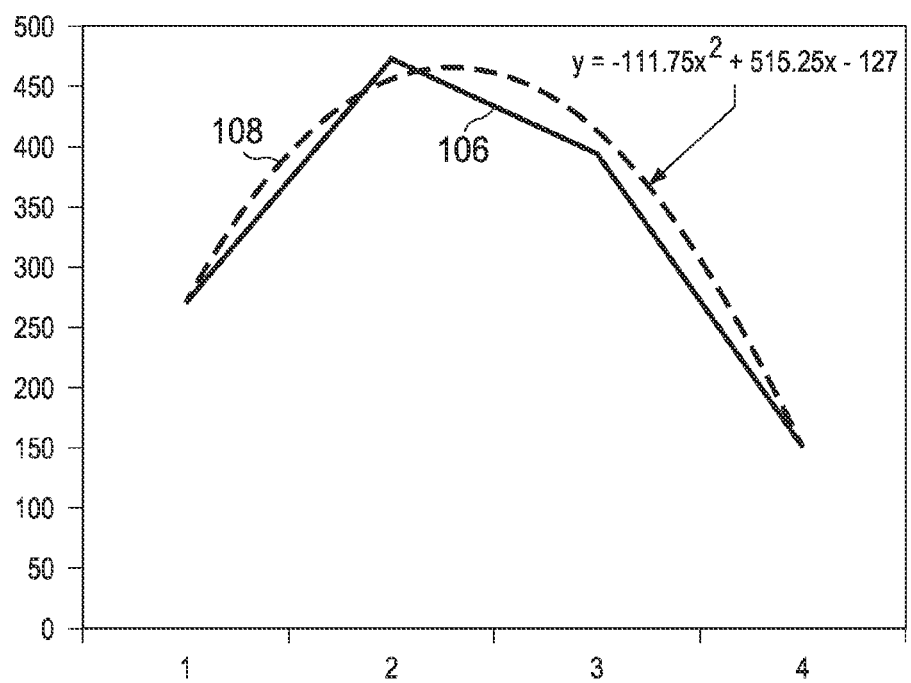
FIGS. 7A-7B illustrates a specific process example for a finger hover condition.

Reference is now made to FIGS. 7A and 7B which illustrate a more detailed implementation of the process. FIG. 7A shows the signal code values for sense nodes 12 within a sub-area of the capacitive touch panel associated with a finger hover (see, FIG. 4C). An evaluation threshold Te (in this case Te=100) is applied against the signal code values to identify an area of interest 100 where the signal code values exceed the evaluation threshold. An expanded area 102 is then identified which additionally includes the sense nodes 12 that are within one node from the area of interest 100. Either a row channel or a column channel is then selected (FIG. 7A showing selection of the column channel) and the signal code values along the selected channel within the expanded area 102 are summed to produce touch profile data values 104.

In an embodiment, the selection of the row or column channel is made based on which channel is wider (i.e., which channel has more data points). In the instance of FIG. 7A, the row and column channels have the same width (i.e., 4). In this case, a default selection of one channel may be made (such as, for example, a default selection of the column channel).

FIG. 7B shows a plotting of the touch profile data values 104 to define a touch profile 106. A curve fitting calculation then performed to fit a parabola 108 to the touch profile 106 (more particularly, to fit the parabola 108 to the touch profile data values 104). The equation for the fitted parabola 108 may then be determined. In this example, the mathematical equation defining the fitted parabola 108 is determined as $y=-111.75x^2+515.25x-127$. The quadratic constant "a" is thus a=−111.75, and the absolute magnitude of the quadratic constant "a" is 111.75.

Figures 8A, 8B:
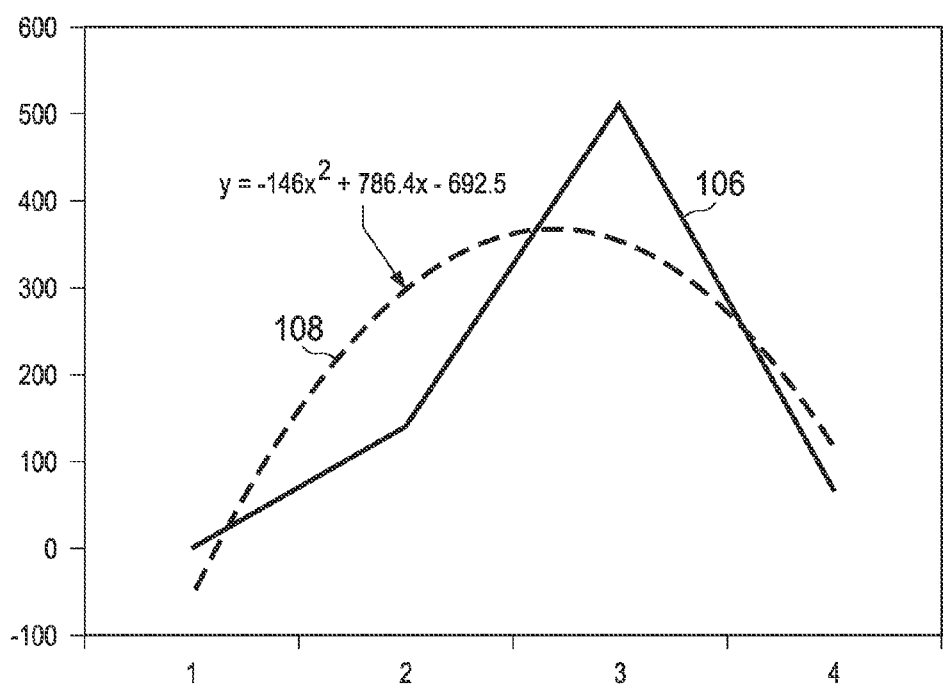
FIGS. 8A-8B illustrate a specific process example for a stylus touch condition.

Reference is now made to FIGS. 8A and 8B which illustrate a more detailed implementation of the process. FIG. 8A shows the signal code values for sense nodes 12 within a sub-area of the capacitive touch panel associated with a stylus touch (see, FIG. 4B). An evaluation threshold Te (in this case Te=100) is applied against the signal code values to identify an area of interest 100 where the signal code values exceed the evaluation threshold. An expanded area 102 is then identified which includes the sense nodes 12 that are within one node from the area of interest 100. Either a row channel or a column channel is then selected (FIG. 8A showing selection of the row channel) and the signal code values along the selected row within the expanded area 102 are summed to produce touch profile data values 104.

In an embodiment, the selection of the row or column channel is made based on which channel is wider (i.e., which channel has more data points). In the instance of FIG. 8A, the row channel is wider (i.e., 4 data points versus 3 data points) so the row channel is selected.

FIG. 8B shows a plotting of the touch profile data values 104 to define a touch profile 106. A curve fitting calculation then performed to fit a parabola 108 to the touch profile 106 (more particularly, to fit the parabola 108 to the touch profile data values 104). The equation for the fitted parabola 108 may then be determined. In this example, the mathematical equation defining the fitted parabola 108 is determined as $y=-146x^2+786.4x-692.5$. The quadratic constant "a" is thus a=−146, and the absolute magnitude of the quadratic constant "a" is 146.

As a result of the parabolic curve fitting for the hover and stylus touch, it will be noted that absolute magnitude of the quadratic constants "a" differ for the hover and stylus touch, and further that the absolute magnitude of the quadratic constant for the stylus touch is greater than the absolute magnitude of the quadratic constant for the hover.

With the quadratic constant threshold value Ta set somewhere between 111.75 and 146, a differentiation between stylus touch and hover detection can be made. As a result of that differentiation, the relatively higher detection threshold can be used to evaluate the touch profile data values 104 for the stylus touch in making a touch detection determination and the relatively lower detection threshold can be used to evaluate the touch profile data values 104 for the hover in making a touch detection determination.

Figure 9:
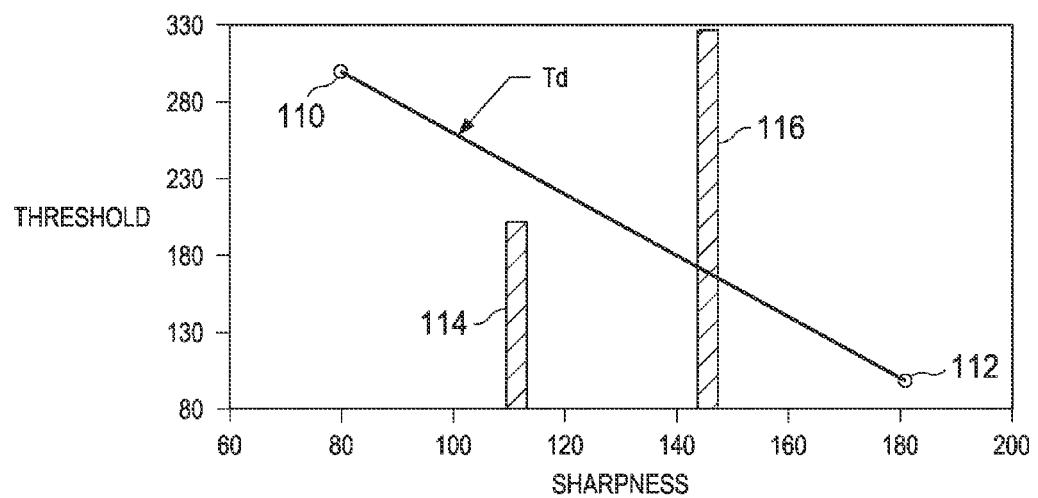
FIG. 9 illustrates the making of touch detection with a threshold varying as a function of sharpness.

In one embodiment, a single detection threshold can be applied with respect to the touch profile data values 104 for the stylus touch and the hover. However, in another embodiment, the detection threshold can vary as a function of the quadratic constant "a". Reference is now made to FIG. 9 which illustrates one example of a varying detection threshold. For example, detection threshold parameters can be established as a function of sharpness (i.e., as a function of quadratic constant "a"). So, for a relatively low sharpness, a higher detection threshold must be met, while for a relatively high sharpness, a lower detection threshold must be met. In the example of FIG. 9, the detection threshold parameters are as follows: a) for a sharpness (quadratic constant "a") of 80, the detection threshold is 300; and b) for a sharpness (quadratic constant "a") of 180, the detection threshold is 100. The detection threshold function Td is then determined from an interpolation from the detection threshold parameters. FIG. 9 illustrates the use of a linear interpolation to derive the detection threshold function Td (with the detection threshold parameters represented as the end points 110 and 112). The use of a linear interpolation is exemplary only, it being understood that other mathematical functions could be selected to define the interpolation.

To make the touch determination using a detection threshold that varies as a function of sharpness (the quadratic constant "a"), the processes described above in connection with FIGS. 6A-6B, 7A-7B and/or 8A-8B are performed to determine the absolute magnitude of the quadratic constant "a" for the fitted parabola, and the detection threshold which corresponds to that the sharpness is identified and compared to the touch profile data. If the touch profile data comparison indicates that the corresponding detection threshold is exceeded, then an actual touch has been detected. Conversely, if the touch profile data comparison indicates that the corresponding detection threshold has not been exceeded, then no actual touch has been detected.

FIG. 9 illustrates this process in the context of the examples of FIGS. 7A-7B and 8A-8B. With respect to the finger hover condition data shown in FIG. 7A, the fitted parabola 108 of FIG. 7B produces an absolute magnitude of the quadratic constant "a" of 111.75. The plot 114 in FIG. 9 shows a maximum signal code value within the area of interest 100 of 186. However, the value of 186 is less than the interpolated corresponding detection threshold for the detection threshold function Td, and thus the finger hover is disqualified from being identified as an actual touch. With respect to the stylus touch condition data shown in FIG. 8A, the fitted parabola 108 of FIG. 8B produces an absolute magnitude of the quadratic constant "a" of 146. The plot 116 in FIG. 9 shows a maximum signal code value within the area of interest 100 of 363. The value of 363 exceeds the interpolated corresponding detection threshold for the detection threshold function Td, and thus the stylus touch is qualified as an actual touch.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
    a capacitive touch system configured to generate data indicative of sensed capacitance in response to an actual touch or hover; and
    a signal processing circuit coupled to the capacitive touch system and configured to: fit a parabolic curve to the data indicative of sensed capacitance in response to the actual touch or hover, determine a sharpness of the fit parabolic curve, and set a touch detection threshold for application against the data indicative of sensed capacitance in response to the actual touch or hover as a function of the determined sharpness.

2. The system of claim 1, wherein the touch detection threshold is set to a relatively lower threshold value if the determined sharpness is higher, and the touch detection threshold is set to a relatively higher threshold value if the determined sharpness is lower.

3. The system of claim 1, wherein the determined sharpness is indicative of a narrowness of a shape of the fit parabolic curve.

4. The system of claim 1, wherein the fit parabolic curve may be mathematically represented by: $y=ax^2+bx+c$, wherein "a" is the quadratic constant and the absolute magnitude of the quadratic constant is the determined sharpness.

5. The system of claim 4, wherein the touch detection threshold is set as a function of the absolute magnitude of the quadratic constant.

6. The system of claim 1, wherein the touch detection threshold is a constant value.

7. The system of claim 1, wherein the touch detection threshold is a variable value set as a function of the determined sharpness.

8. The system of claim 1, wherein data indicative of sensed capacitance in response to the actual touch or hover provides data at each of a plurality of capacitive sensing nodes of the capacitive touch system, the signal processing circuit further configured to determine touch profile data from the data indicative of sensed capacitance in response to the actual touch or hover, and wherein the parabolic curve is fit to the touch profile data.

9. The system of claim 8, wherein the touch profile data is obtained by summing data indicative of sensed capacitance in response to the actual touch or hover over a plurality of either rows or columns of the capacitive sensing nodes.

10. The system of claim 8, wherein the touch profile data is obtained by selecting data indicative of sensed capacitance in response to the actual touch or hover from either a row or column of data of the capacitive sensing nodes.

11. The system of claim 8, wherein the signal processing circuit is further configured to: identify an area plurality of capacitive sensing nodes having data indicative of sensed capacitance in response to the actual touch or hover in excess an evaluation threshold, identify an expanded area surrounding the identified area, and determine the touch profile data from the data indicative of sensed capacitance in response to the actual touch or hover of the capacitive sensing nodes that are located within said area and expanded area.

12. The system of claim 1, wherein the capacitive touch system comprises: a touch panel including signal lines and sense lines, a drive circuit coupled to each signal line and a sense circuit coupled to each sense line.

13. The system of claim 1, wherein the signal processing circuit is further configured to compare the data indicative of sensed capacitance in response to the actual touch or hover to the set touch detection threshold and make a touch detection determination from the comparison.

14. A method, comprising:
    generating data indicative of sensed capacitance at a capacitive touch system in response to an actual touch or hover;
    fitting a parabolic curve to the data indicative of sensed capacitance in response to the actual touch or hover;
    determining a sharpness of the fit parabolic curve; and
    setting a touch detection threshold for application against the data indicative of sensed capacitance in response to the actual touch or hover as a function of the determined sharpness.

15. The method of claim 14, wherein setting comprising setting the touch detection threshold to a relatively lower threshold value if the determined sharpness is higher and setting the touch detection threshold to a relatively higher threshold value if the determined sharpness is lower.

16. The method of claim 14, wherein the fit parabolic curve may be mathematically represented by: $y=ax^2+bx+c$, wherein "a" is the quadratic constant and the absolute magnitude of the quadratic constant is the determined sharpness.

17. The method of claim 16, wherein setting comprises setting the touch detection threshold as a function of the absolute magnitude of the quadratic constant.

18. The method of claim 14, wherein setting comprises setting the touch detection threshold to a constant value.

19. The method of claim 14, wherein setting comprises setting the touch detection threshold to a variable value set as a function of the determined sharpness.

20. The method of claim 14, wherein generating comprises generating data indicative of sensed capacitance in response to the actual touch or hover at each of a plurality of capacitive sensing nodes, further comprising: determining touch profile data from the data indicative of sensed capacitance in response to the actual touch or hover, and wherein fitting comprises fitting the parabolic curve to the touch profile data.

21. The method of claim 20, wherein determining the touch profile data comprises summing data indicative of sensed capacitance in response to the actual touch or hover over a plurality of either rows or columns of the capacitive sensing nodes.

22. The method of claim 20, wherein determining the touch profile data comprises selecting data indicative of sensed capacitance in response to the actual touch or hover from either a row or column of data of the capacitive sensing nodes.

23. The method of claim 20, further comprising: identifying an area of the plurality of capacitive sensing nodes having data indicative of sensed capacitance in response to the actual touch or hover in excess an evaluation threshold; identifying an expanded area surrounding the identified area; and determining the touch profile data from the data indicative of sensed capacitance in response to the actual touch or hover of the capacitive sensing nodes that are located within said area and expanded area.

24. The method of claim 14, further comprising comparing the data indicative of sensed capacitance in response to the actual touch or hover to the set touch detection threshold and making a touch detection determination from the comparison.

* * * * *